(12) United States Patent
Rothoff

(10) Patent No.: US 6,591,677 B2
(45) Date of Patent: Jul. 15, 2003

(54) SYSTEM AND METHOD FOR DETECTING VEHICLE MECHANICAL LOADING

(75) Inventor: Marcus Rothoff, Gothenburg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/683,641

(22) Filed: Jan. 29, 2002

(65) Prior Publication Data

US 2002/0144543 A1 Oct. 10, 2002

(30) Foreign Application Priority Data

Jan. 29, 2001 (EP) .............................................. 01101951

(51) Int. Cl.⁷ .............................................. G01P 15/00
(52) U.S. Cl. ................................................... 73/514.01
(58) Field of Search ............................ 73/65.01, 65.07, 73/65.09, 760, 382 R, 488, 511, 514.01, 514.02

(56) References Cited

U.S. PATENT DOCUMENTS

| | | | | |
|---|---|---|---|---|
| 5,063,512 A | * | 11/1991 | Kamimura et al. | 701/37 |
| 5,173,858 A | * | 12/1992 | Wada et al. | 701/37 |
| 5,295,074 A | * | 3/1994 | Williams | 701/37 |
| 5,338,058 A | * | 8/1994 | Ohtagaki et al. | 280/5.519 |
| 5,351,540 A | * | 10/1994 | Gee | 73/509 |
| 6,282,496 B1 | * | 8/2001 | Chowdhary | 701/220 |
| 6,382,018 B2 | * | 5/2002 | Knestel | 73/118.1 |

* cited by examiner

*Primary Examiner*—Max Noori
(74) *Attorney, Agent, or Firm*—Carlos L. Hanze

(57) ABSTRACT

A system for detecting the loading of a vehicle including at least one accelerometer in a first position and arranged in gravitational acceleration in the preferred direction may be used as a reference value for the accelerometer. The accelerometer related to detect the deviation of acceleration relative to said reference value, and said deviation is related to the loading of the vehicle.

16 Claims, 2 Drawing Sheets

SYSTEM AND METHOD FOR DETECTING VEHICLE MECHANICAL LOADING

BACKGROUND OF INVENTION

1. Field of the Invention

The present invention relates to a detecting system and a method for estimating the loading and height of a vehicle.

2. Technical Background

There are various types of conventional height-estimators for vehicles currently being used in order to improve the control of the wheel-suspension of a vehicle and thus the driving comfort. One estimator type, preferably connected between a sprung and an unsprung part of a vehicle, has a hinged arm with position sensors. Depending on the loading of the vehicle the connected hinged arm of the installed estimator will assume a certain position for a given distance and the distance detected by the prior art estimator is increased or decreased. This estimated distance could be used as input data to advanced wheel-suspension control systems and the like.

The position between e.g. the body and the wheel suspension of a vehicle, where the estimator is preferably placed, experiences rough conditions, especially during driving in mud, snow, ice etc. and also mechanical wear. The height-estimating device of the above-described type is sensitive to these kinds of conditions due to the fact that the hinged arm cannot be fully protected from these conditions. This, of course, may affect the functionality of the hinged arm and the sensors, especially in severe conditions.

Another issue of the above described height-estimating device is that it is difficult to install and calibrate the device correctly in relation to other height-estimating devices of the vehicle. Not only is the position between the body and the wheel-suspension difficult to access for a mechanic during manufacturing of the vehicle, it is also difficult to maintain the precision of the system during use of the vehicle due to the sensitivity of the arm to outer influence.

SUMMARY OF INVENTION

The object of the present invention is to provide a reliable system that overcomes the above issues, and makes it possible to provide a detecting system for estimating the loading and height of a vehicle. A further object of the present invention is to provide an accurate and precise method for estimating the loading and height of a vehicle.

It is still a further object to provide a detecting system that is easy to install in a vehicle and can withstand tough conditions.

According to the invention there is provided a detecting system for detecting the loading of a vehicle, wherein the detecting system comprises at least one accelerometer in a first position and arranged in a predefined direction on said vehicle, wherein the acceleration of gravity in said predefined direction may be used as a reference value for the accelerometer and said accelerometer is arranged to detect the deviation of acceleration relative to said first position, said deviation being related to the loading of said vehicle. This system provides a load detecting system comprising at least one accelerometer that is easy to install. The first position and direction of the accelerometer on the vehicle can conveniently be established after the installation using the acceleration of gravity as reference value. Further, the accelerometer does not need any outer movable parts and can be fitted in a cover. The cover is preferably adapted to a desired position on the vehicle.

In an embodiment of the invention the detected change in vertical acceleration relative to said first position is related to an angular displacement of the accelerometer from said first position, relative to a point, caused by the displacement of a vehicle due to the actual loading.

This arrangement provides a possibility of detecting the loading or height of a vehicle by using the relation of how loading affects the angle of a sprung part of the vehicle. Preferably the accelerometer is arranged fixedly in relation to a hub of said vehicle and the change in camber and/or caster is detected. In a preferred embodiment the accelerometer is installed on a shaft of a spindle. Depending on the type of shaft the camber readings can be taken into account. In an alternative embodiment the accelerometer is arranged on a shaft where the caster readings are to be taken into account. It is understood that an accelerometer of the inventive load detecting system placed at every wheel of a vehicle provides a more accurate reading of the loading to which every wheel is exposed.

Preferably the accelerometer is a capacitive accelerometer that makes it possible to detect static as well as dynamic loading of said vehicle. The load detecting system can also be used for determination of the dynamic camber on a vehicle tire, performed while the tire is moving along an actual road surface and mounted on an actual vehicle of the type on which the tire will be used, which data can then be used in order to test various modifications and changes to a tire in a test facility, in order to arrive at the optimum tire design for a particular vehicle.

In a further preferred embodiment of the invention the detecting system is connected to a system of level detectors arranged on the vehicle body.

This arrangement makes it possible to establish how the vehicle is positioned relative to the normal horizontal plane so that e.g. the effects of a wheel on a curb or the vehicle being parked on a steep slope do not lead to miscalculations of the load distribution of the vehicle.

The detecting system is preferably connected to a control unit in order to control the springing and damping behavior of said vehicle. For this purpose the detecting system according to a preferred embodiment of the invention is connected to a spring and damper system of said vehicle. This arrangement makes it possible to detect the road clearance. In situations where the clearance is insufficient due to e.g. heavy carrying load or the fact that the vehicle passes an uneven spot on the road the spring and damper system of the vehicle can be activated in order to prevent damage.

These objects and advantages are further achieved by the method of the present invention for detecting the loading of a vehicle, wherein the method comprises the following steps: arranging at least one accelerometer in a first position and in a predefined direction on said vehicle, using the acceleration of gravity in said predefined direction as a reference value for the accelerometer, and using said accelerometer for detecting the deviation of vertical acceleration relative to said first position, said deviation being related to the loading of said vehicle.

In a further preferred embodiment of the present invention the method comprises the step of combining said detecting system with a system of vehicle body level detectors, for identifying a reference level from which the deviation depending on the actual loading of said vehicle may be identified by said detecting system. This method makes it possible to establish how the vehicle is positioned relative to the normal horizontal plane so that e.g. the effects of a wheel on a curb or the vehicle being parked on a steep slope do not lead to an erroneous detection of the load distribution of the vehicle by the accelerometers.

BRIEF DESCRIPTION OF DRAWINGS

A currently preferred embodiment of the present invention will now be described in more detail, with reference to the accompanying drawings.

DETAILED DESCRIPTION

Figures 1, 2:
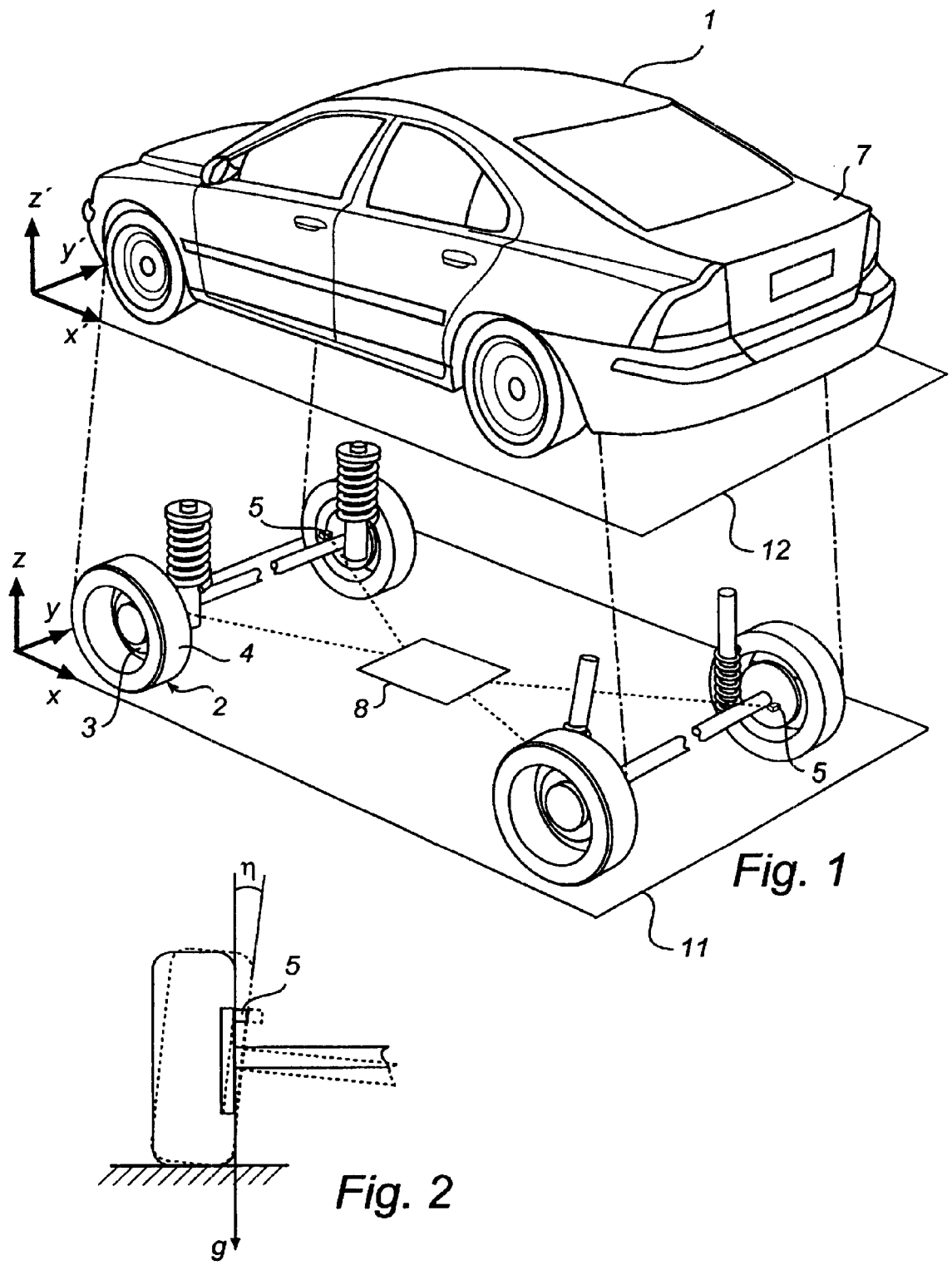
FIG. 1 is an exploded perspective view of a vehicle with a loading detecting system according to a first embodiment of the invention.
FIG. 2 is a schematic partial view, illustrating the effect of different loading on the camber, of an embodiment of the present invention.

The embodiments of the invention, which will be described in the following, are related to a load estimate system for a vehicle. Refer now to FIGS. 1 and 2, in which vehicle 1 provided with the inventive load estimator is shown. The detecting system comprises one accelerometer 5 arranged on said vehicle 1, in which the acceleration of gravity in a first position can be used as a reference value for the accelerometer 5. The accelerometer 5 is arranged fixedly in relation to a hub 3 for detecting the deviation of vertical acceleration relative to said first position. Said deviation is related to the loading of said vehicle 1. Preferably, there is an accelerometer arranged fixedly in relation to a hub 3 of every wheel 2 of said vehicle 1.

An accelerometer arranged stationary on Earth with its sensitive axis pointing vertically will give an output signal equivalent to one g, or 9.8 m/s$^2$ (32.2 ft/s$^2$), assuming that it responds to static acceleration inputs. If this accelerometer is rotated through 90 degrees and left stationary with its sensitive axis pointing parallel to the surface on Earth, it will produce an output signal equivalent to zero g.

In the preferred embodiment of the invention a capacitive accelerometer is used since it has the advantage of responding to both static and dynamic acceleration input. The polling frequency during driving is preferably between 400 and 500 Hz. During driving, the vertical acceleration measured by the detecting system might deviate quite a lot from g, which is why the sensitivity of the accelerometers 5 preferably decreases the more the acceleration deviates from one g.

When measuring the downloading of the vehicle during standstill, the accelerometer 5 has accuracy in the range around one g where a deviation of 1 mm is detectable. The sampling frequency of the acceleration during standstill can be significantly lower than during driving.

The detecting system is connected to a control unit 8, in which the collected data is processed to provide input data to other control functions in the vehicle 1. One of the functions is to control the springing and damping behavior of said vehicle 1.

The method comprises the steps of arranging at least one accelerometer 5 in a first position and in a predefined direction, preferably on the hub 3 of a wheel 4 of said vehicle 1. The gravitational acceleration in said predefined direction is used as a reference value for the accelerometer 5. If the camber is changed due to a change in loading of the vehicle, this change is detected by the accelerometer as a change in vertical acceleration relative to the reference value.

In an alternative embodiment of the invention the change in vertical acceleration can be detected as a change in caster or a combination of caster or camber. The above-described change relative to said first reference value is caused by the displacement of the vehicle height due to the impact of loading preferably on the camber. An example of the change in camber is given in FIG. 2.

Figure 3:
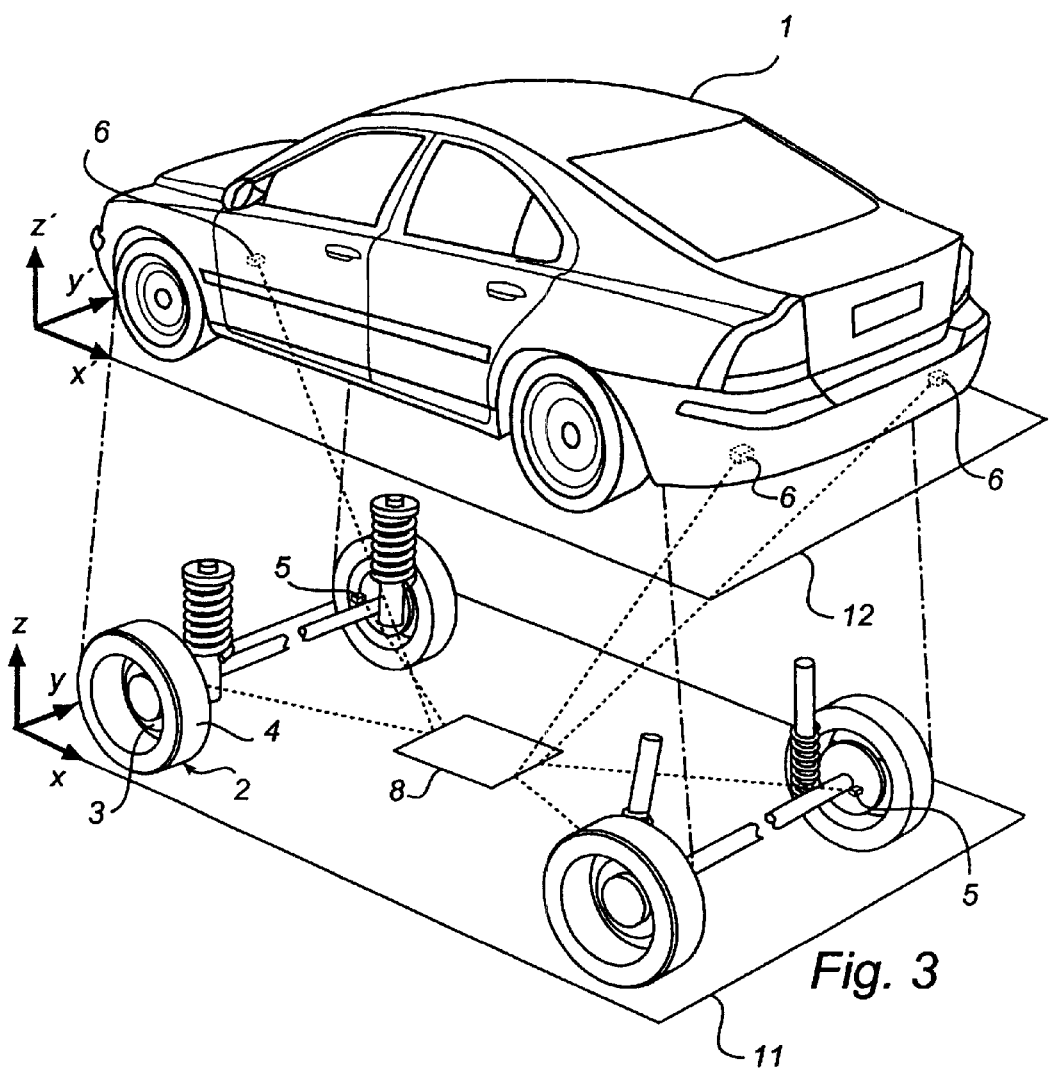
FIG. 3 is an exploded perspective view of a vehicle with a loading detecting system according to a second embodiment of the present invention.

With reference to FIG. 3, a further preferred embodiment of the present invention is provided, where a system of level detectors 6 is arranged on the vehicle body. Preferably there are at least three level detectors in order to determine a reference plane 12 of the body of the vehicle. This reference plane 12 is then used as a reference level 12 from which the deviation depending on the current loading of said vehicle is identified by said detecting system.

The present invention should not be considered limited to the above-described preferred method and embodiments, but rather includes all possible variations covered by the scope defined by the appended claims.

It is thus to be appreciated that the detecting system can be designed in many different ways using high- and low pass filtering techniques and various types of processing equipment in order to provide an appropriate method to control the height, springing and damping behavior of the vehicle. The control unit can be e.g. a processing unit or a computer.

The exact shape, size and position on the vehicle of the accelerometers can also be modified as well as the type of accelerometer in order to meet specific requirements and are in the above only given as guidance.

The detecting system is intended for all kinds of vehicles such as trucks, vans, tanks etc. and is not limited to a car as shown in FIG. 1.

What is claimed is:

1. A system for detecting the loading of a vehicle, comprising at least one accelerometer disposed in a first position and arranged in a predefined direction on said vehicle such that acceleration of gravity in the predefined direction is used as a reference value for said accelerometer, said accelerometer being arranged for detecting deviation of vertical acceleration relative to the reference value, the deviation being related to the loading of the vehicle, and a system of level detectors arranged on the vehicle.

2. The detecting system according to claim 1, wherein the detected deviation in vertical acceleration relative to the reference value is related to an angular displacement of said accelerometer from the first position relative to a point, caused by the displacement of the vehicle due to actual loading.

3. The detecting system according to claim 1, wherein the vehicle comprises a hub and said accelerometer is arranged fixedly in relation to said hub.

4. The detecting system according claim 1, wherein the vehicle comprises a plurality of hubs and corresponding wheels and said accelerometer is arranged fixedly in relation to each of said hubs.

5. A detecting system according to claim 1, wherein the detecting system is coupled to a spring and damper system of the vehicle.

6. The detecting system according to claim 1, wherein said accelerometer is arranged to detect dynamic loading of the vehicle.

7. The detecting system according to claim 1, wherein said accelerometer is a capacitive accelerometer.

8. The detecting system according to claim 1, wherein said accelerometer is arranged to detect static loading of the vehicle.

9. The detecting system according to claim 1, wherein the detecting system comprises a control unit for controlling the springing and damping behavior of the vehicle.

10. A method for detecting the loading of a vehicle, comprising:

arranging at least one accelerometer in a first position and in a predefined direction on the vehicle;

using the acceleration of gravity in the predefined direction as a reference value for the accelerometer;

using the accelerometer to detect the deviation of vertical acceleration relative to the reference value, the deviation being related to the loading of said vehicle as a function of loading on a camber of a hub of the vehicle.

11. The method according to claim 10, further comprising the step of using a control unit and a spring and damper system of the vehicle in order to control the springing and damping behavior of the vehicle.

12. The method according to claim 10, further comprising the step of detecting an angular displacement of the accelerometer relative to the first direction caused by the displacement of the vehicle height due to loading.

13. The method according to claim 10, further comprising the step of detecting static loading of the vehicle.

14. The method according to claim 10, further comprising the step of detecting a camber of a hub (3) of every wheel (2) of the vehicle.

15. The method according to claim 10, further comprising the step of using a system of vehicle body level detectors for identifying a reference level from which the deviation depending on the actual loading of the vehicle may be identified.

16. The method according to claim 10, further comprising the step of detecting dynamic loading of the vehicle.

* * * * *